United States Patent
Zhao et al.

(10) Patent No.: US 11,665,243 B2
(45) Date of Patent: May 30, 2023

(54) METHOD OF ESTABLISHING DEVICE CORRELATION, AND ELECTRONIC DEVICE

(71) Applicants: Beijing BOE Technology Development Co., Ltd., Beijing (CN); BOE Technology Group Co., Ltd., Beijing (CN)

(72) Inventors: Junjie Zhao, Beijing (CN); Jing Su, Beijing (CN); Qian Zhang, Beijing (CN); Yanqiu Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/628,960

(22) PCT Filed: Jul. 24, 2020

(86) PCT No.: PCT/CN2020/104025
§ 371 (c)(1),
(2) Date: Jan. 21, 2022

(87) PCT Pub. No.: WO2021/013237
PCT Pub. Date: Jan. 28, 2021

(65) Prior Publication Data
US 2022/0263908 A1    Aug. 18, 2022

(30) Foreign Application Priority Data
Jul. 25, 2019 (CN) .......................... 201910677046.X

(51) Int. Cl.
*H04L 67/141* (2022.01)
(52) U.S. Cl.
CPC .................................. *H04L 67/141* (2013.01)

(58) Field of Classification Search
CPC ....... H04L 67/141; H04L 67/306; H04L 67/12; H04L 67/303
(Continued)

(56) References Cited

U.S. PATENT DOCUMENTS 9,495,234 B1 * 11/2016 Hamman ................ H04L 43/20
10,817,496 B2 * 10/2020 Deolalikar ............ G06F 16/285
(Continued)

FOREIGN PATENT DOCUMENTS

| CN | 108075902 A | 5/2018 | |
|---|---|---|---|
| WO | WO-2009030245 A1 * | 3/2009 | ....... G06F 17/30864 |

(Continued)

OTHER PUBLICATIONS

First Examination Report, for Indian Patent Application No. 202247009308, dated Jul. 12, 2022, 5 pages.

*Primary Examiner* — Ruolei Zong
(74) *Attorney, Agent, or Firm* — Westman, Champlin & Koehler, P.A.

(57) ABSTRACT

The present disclosure provides a method of establishing a device correlation and an electronic device. The method includes: receiving a first correlation establishment request transmitted by a first device, wherein the first correlation establishment request indicates establishing a correlation between a first device and a second device, and a device correlation is established between the second device and a third device; acquiring a first correlation strength between the first device and the second device, and a second correlation strength between the second device and the third device; establishing a device combination correlation between the first device, the second device and the third device in response to the first correlation strength being less than or equal to the second correlation strength; and establishing a device preemption correlation between the first device and the second device in response to the first corre- (Continued)

lation strength being greater than the second correlation strength.

17 Claims, 6 Drawing Sheets

(58) Field of Classification Search
USPC .......................................................... 709/227
See application file for complete search history.

(56) References Cited

U.S. PATENT DOCUMENTS

2016/0277528 A1* 9/2016 Guilaume .......... G06Q 30/0206
2017/0193296 A1* 7/2017 Duong .................... G06F 18/22

FOREIGN PATENT DOCUMENTS

| WO | WO-2014109040 A1 * | 7/2014 | ....... G06F 17/30256 |
| WO | 2019075863 A1 | 4/2019 | |

* cited by examiner

METHOD OF ESTABLISHING DEVICE CORRELATION, AND ELECTRONIC DEVICE

CROSS REFERENCE TO RELATED APPLICATION(S)

This application is a Section 371 National Stage Application of International Application No. PCT/CN2020/104025, filed on Jul. 24, 2020, which published as WIPO Publication No. WO 2021/013237 A1, on Jan. 28, 2021, not in English, which claims priority to Chinese patent Application No. CN201910677046.X, filed on Jul. 25, 2019, entitled "method of establishing device correlation, and electronic device," the contents of which are incorporated herein by reference in their entireties.

TECHNICAL FIELD

The present disclosure relates to a field of a device management technology, and in particular to a method of establishing a device correlation and an electronic device.

BACKGROUND

With a development and a popularization of an Internet of things technology, a connection has become a basic attribute of an Internet of things device. When devices are connected to a subject, there is a correlation between the devices. By analyzing data generated by a plurality of devices with the correlation, an information associated with the subject may be determined better, so that an accuracy of a determination may be improved.

In a related technical solution, a dynamic change in a correlation between devices is not considered, which reduces the accuracy of the determination of the subject connected to the devices.

SUMMARY

Embodiments of the present disclosure provide a method of establishing a device correlation performed at a device management platform, including:

receiving a first correlation establishment request transmitted by a first device, wherein the first correlation establishment request indicates establishing a correlation between the first device and a second device, and a device correlation is established between the second device and a third device;

acquiring a first correlation strength between the first device and the second device, and a second correlation strength between the second device and the third device;

establishing a device combination correlation between the first device, the second device and the third device in response to the first correlation strength being less than or equal to the second correlation strength; and establishing a device preemption correlation between the first device and the second device in response to the first correlation strength being greater than the second correlation strength.

In some embodiments, the method further includes: prior to receiving the first correlation establishment request transmitted by the first device, receiving a second correlation establishment request indicating establishing a correlation between the third device and the second device; and establishing the device correlation between the second device and the third device based on the second correlation establishment request.

In some embodiments, the method further includes: prior to receiving the second correlation establishment request, receiving registration requests respectively transmitted by the first device, the second device and the third device; and registering the first device, the second device and the third device on the device management platform based on the registration requests.

In some embodiments, the acquiring a first correlation strength between the first device and the second device includes:

acquiring a first device type of the first device and a second device type of the second device;

acquiring a second number between the first device and the second device, wherein the second number indicates a number of device through which the first device and the second device exchange information; and calculating the first correlation strength based on the first device type, the second device type and the second number.

In some embodiments, the acquiring a second correlation strength between the second device and the third device includes:

acquiring a second device type of the second device and a third device type of the third device;

acquiring a first number between the second device and the third device, wherein the first number indicates a number of device through which the second device and the third device exchange information; and calculating the second correlation strength based on the second device type, the third device type and the first number.

In some embodiments, the establishing a device combination correlation between the first device, the second device and the third device includes:

establishing a short-term device combination correlation between the first device, the second device and the third device; or establishing a long-term device combination correlation between the first device, the second device and the third device.

In some embodiments, the establishing a short-term device combination correlation between the first device, the second device and the third device includes:

establishing the short-term device combination correlation between the first device, the second device and the third device in response to the first device being a temporary device.

In some embodiments, the establishing a long-term device combination correlation between the first device, the second device and the third device includes:

establishing the long-term device combination correlation between the first device, the second device and the third device in response to the first device being a long-term device.

The embodiments of the present disclosure further provide an apparatus of establishing a device correlation applied at a device management platform, including:

a first request receiving module configured to receive a first correlation establishment request transmitted by a first device, wherein the first correlation establishment request indicates establishing a correlation between the first device and a second device, and a device correlation is established between the second device and a third device;

a correlation strength acquisition module configured to acquire a first correlation strength between the first device and the second device, and a second correlation strength between the second device and the third device;

a combination correlation establishment module configured to establish a device combination correlation between the first device, the second device and the third device in response to the first correlation strength being less than or equal to the second correlation strength;

a preemption correlation establishment module configured to establish a device preemption correlation between the first device and the second device in response to the first correlation strength being greater than the second correlation strength.

In some embodiments, the apparatus further includes:

a second request receiving module configured to receive a second correlation establishment request indicating establishing a correlation between the third device and the second device;

a device correlation establishment module configured to establish the device correlation between the second device and the third device based on the second correlation establishment request.

In some embodiments, the apparatus further includes:

a registration request receiving module configured to receive registration requests respectively transmitted by the first device, the second device and the third device;

a device registration module configured to register the first device, the second device and the third device on the device management platform based on the registration requests.

In some embodiments, the correlation strength acquisition module includes:

a first type and second type acquisition sub-module configured to acquire a first device type of the first device and a second device type of the second device;

a second number acquisition sub-module configured to acquire a second number between the first device and the second device, wherein the second number indicates a number of device through which the first device and the second device exchange information;

a first strength calculation sub-module configured to calculate the first correlation strength based on the first device type, the second device type and the second number.

In some embodiments, the correlation strength acquisition module includes:

a second type and third type acquisition sub-module configured to acquire a second device type of the second device and a third device type of the third device;

a first number acquisition sub-module configured to acquire a first number between the second device and the third device, wherein the first number indicates a number of device through which the second device and the third device exchange information;

a second strength calculation sub-module configured to calculate the second correlation strength based on the second device type, the third device type and the first number.

In some embodiments, the combination correlation establishment module includes:

a short-term combination correlation establishment sub-module configured to establish a short-term device combination correlation between the first device, the second device and the third device; or a long-term combination correlation establishment sub-module configured to establish a long-term device combination correlation between the first device, the second device and the third device;

In some embodiments, the short-term combination correlation establishment sub-module includes:

a short-term correlation establishment sub-module configured to establish the short-term device combination correlation between the first device, the second device and the third device in response to the first device being a temporary device.

In some embodiments, the long-term combination correlation establishment sub-module includes:

a long-term correlation establishment sub-module configured to establish the long-term device combination correlation between the first device, the second device and the third device in response to the first device being a long-term device.

The embodiments of the present disclosure further provide an electronic device for establishing a device correlation, including: a processor; a memory having instructions stored thereon, wherein the instructions, when executed by the processor, cause the processor to: receive a first correlation establishment request transmitted by a first device, wherein the first correlation establishment request indicates establishing a correlation between the first device and a second device, and a device correlation is established between the second device and a third device; acquire a first correlation strength between the first device and the second device, and a second correlation strength between the second device and the third device; establish a device combination correlation between the first device, the second device and the third device in response to the first correlation strength being less than or equal to the second correlation strength; and establish a device preemption correlation between the first device and the second device in response to the first correlation strength being greater than the second correlation strength.

In some embodiments, the instructions, when executed by the processor, further cause the processor to: receive a second correlation establishment request indicating establishing a correlation between the third device and the second device; and establish the device correlation between the second device and the third device based on the second correlation establishment request.

In some embodiments, the instructions, when executed by the processor, further cause the processor to: receive registration requests respectively transmitted by the first device, the second device and the third device; and register the first device, the second device and the third device on the device management platform based on the registration requests.

In some embodiments, the instructions, when executed by the processor, further cause the processor to: acquire a first device type of the first device and a second device type of the second device; acquire a second number between the first device and the second device, wherein the second number indicates a number of device through which the first device and the second device exchange information; and calculate the first correlation strength based on the first device type, the second device type and the second number.

In some embodiments, the instructions, when executed by the processor, further cause the processor to: acquire a second device type of the second device and a third device type of the third device; acquire a first number between the second device and the third device, wherein the first number indicates a number of device through which the second device and the third device exchange information; and calculate the second correlation strength based on the second device type, the third device type and the first number.

In some embodiments, the instructions, when executed by the processor, further cause the processor to: establish a short-term device combination correlation between the first device, the second device and the third device; or establish a long-term device combination correlation between the first device, the second device and the third device.

In some embodiments, the instructions, when executed by the processor, further cause the processor to: establish the short-term device combination correlation between the first device, the second device and the third device in response to the first device being a temporary device.

In some embodiments, the instructions, when executed by the processor, further cause the processor to: establish the long-term device combination correlation between the first device, the second device and the third device in response to the first device being a long-term device.

The embodiments of the present disclosure further provide a computer-readable storage medium having instructions stored thereon, wherein the instructions, when executed by a processor, cause the processor to perform any method described above.

DETAILED DESCRIPTION OF EMBODIMENTS

In order to make the above objectives, features and advantages of the present disclosure more obvious and understandable, the present disclosure will be further described in detail below with reference to the drawings and specific embodiments.

Figure 1:
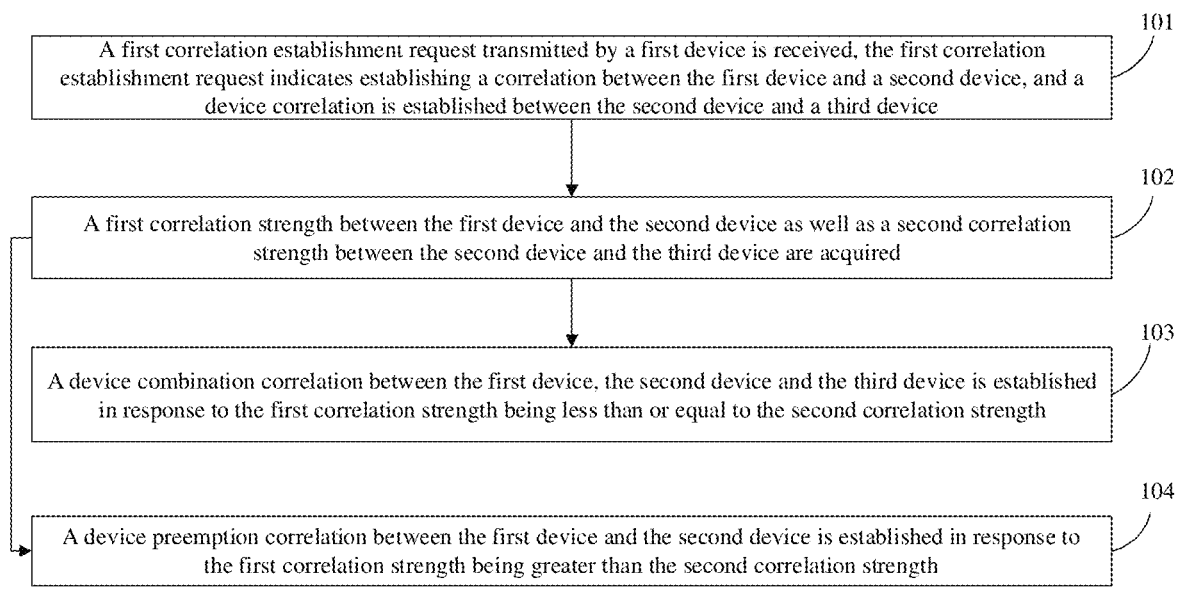
FIG. 1 shows a step flowchart of a method of establishing a device correlation provided by some embodiments of the present disclosure.

FIG. 1 shows a step flowchart of a method of establishing a device correlation provided by some embodiments of the present disclosure. The method of establishing the device correlation may be applied to a device management platform, and may specifically include following steps.

In step 101, a first correlation establishment request transmitted by a first device is received. The first correlation establishment request indicates establishing a correlation between the first device and a second device. A device correlation is established between the second device and a third device.

In the embodiments of the present disclosure, the device management platform refers to a platform used to manage devices. The device may refer to a household device, such as a refrigerator, a television, an air purifier, a magic mirror, and other electronic devices.

The first device, the second device and the third device described above refer to three different devices. For example, the first device may be a television, the second device may be a refrigerator, and the third device may be an air purifier. Certainly, the first device, the second device and the third device may be devices of the same type. For example, the first device, the second device and the third device are all refrigerators. It may be understood that when the first device, the second device and the third device are all refrigerators, these three devices may be devices of the same type in the same household or in different households, that is, these three devices are three different devices of the same type. For example, the first device is a refrigerator 1, the second device is a refrigerator 2, the third device is a refrigerator 3, and so on.

It may be understood that the above examples are listed only for better understanding of the technical solutions of the embodiments of the present disclosure, and are not intended as the only limitation to the embodiments of the present disclosure.

Certainly, the first device, the second device and the third device are all pre-registered on the device management platform. A device registration process will be described in detail in the following embodiments, and will not be described in detail in this embodiment.

A device correlation refers to establishing a correlation between two or more devices. For example, a health management platform may track and analyze a food situation in a family, so as to obtain an evaluation indicator for a dietary health of the family and guide a healthy diet of the family. For example, refrigerators in the family and shopping carts used by family members are all registered on the health management platform, and the refrigerator 1 and the refrigerator 2 may be correlated.

A device correlation between the second device and the third device is pre-established. A process of pre-establishing the device correlation between the second device and the third device will be described in detail in the following embodiments, and will not be described in detail in this embodiment.

A first correlation establishment request refers to a request initiated by the first device to the device management platform to establish a correlation with the second device. Certainly, since the device correlation between the second device and the third device was already established, the first correlation establishment request may also be a request initiated by the first device to establish a correlation with the third device, which may be specifically determined according to actual conditions.

After the device management platform receives the first correlation establishment request transmitted by the first device, step 102 is performed.

In step 102, a first correlation strength between the first device and the second device as well as a second correlation strength between the second device and the third device are acquired.

The first correlation strength refers to a correlation strength between the first device and the second device, and the second correlation strength refers to a correlation strength between the second device and the third device.

The method of acquiring the first correlation strength may include acquiring a number of device through which the first device and the second device exchange information, and calculating the first correlation strength according to the number of device.

The method of acquiring the second correlation strength may include acquiring a number of device through which the second device and the third device exchange information, and calculating the second correlation strength according to the number of device.

A detailed process of calculating the first correlation strength and the second correlation strength will be described in detail in the following embodiments, and will not be described in detail in this embodiment.

After the first correlation strength between the first device and the second device and the second correlation strength between the second device and the third device are acquired, step 103 and step 104 are performed.

In step 103, a device combination correlation between the first device, the second device and the third device is established in response to the first correlation strength being less than or equal to the second correlation strength.

The device combination correlation refers to a device correlation established between two or more devices, such as a device correlation established between three devices or five devices.

In the above steps, after the first correlation strength between the first device and the second device and the second correlation strength between the second device and the third device are acquired, the first correlation strength and the second correlation strength may be compared.

In response to the first correlation strength being less than or equal to the second correlation strength, the device combination correlation between the first device, the second device and the third device may be established.

In a case that the first correlation strength is less than or equal to the second correlation strength, that is, in a case that the correlation strength between the first device and the second device is less than or equal to the correlation strength between the second device and the third device, because the device correlation between the second device and the third device was already established, a combination correlation between the first device, the second device and the third device may be established. For example, the first device may be represented by AE1, the second device may be represented by AE2, the third device may be represented by AE3, the device correlation established between the second device and the third device may be represented by (AE2, AE3), and the combination correlation established between the first device, the second device and the third device may be represented by (AE1, (AE2, AE3)).

It may be understood that the above examples are listed only for better understanding of the technical solutions of the embodiments of the present disclosure, and are not intended as a limitation to the embodiments of the present disclosure.

Certainly, in the present disclosure, a correlation strength threshold may be preset, and the device correlation between the devices is established only in a case that the correlation strength between the devices is greater than the correlation strength threshold.

The correlation strength threshold refers to a threshold of the correlation strength between devices preset by a servicer on the device management platform.

The correlation strength threshold may be 5, 8, 10, etc., which may be specifically determined according to business requirements and is not limited in the embodiments of the present disclosure.

A device correlation between two devices may be established when a correlation strength between the two devices is greater than the correlation strength threshold. When the correlation strength between the two devices is less than or equal to the correlation strength threshold, the two devices do not meet a condition for establishing the device correlation.

A magnitude relationship between the first correlation strength and the correlation strength threshold may be determined.

In a case that the first correlation strength is greater than the correlation strength threshold, it means that the device correlation between the first device and the second device may be established, and the device correlation between the first device and the third device may be established.

In a case that the first correlation strength is less than or equal to the second correlation strength, that is, in a case that the correlation strength between the first device and the second device is less than or equal to the correlation strength between the second device and the third device, it may be determined whether the first correlation strength and the second correlation strength are greater than the correlation strength threshold or not. Only when it is determined that the first correlation strength is greater than the correlation strength threshold, the device combination correlation between the first device, the second device and the third device may be established.

Certainly, in the present disclosure, it is also possible to determine whether to establish a long-term correlation or a short-term correlation between the three devices according to a device type of the first device, which may be described in detail in the following embodiments and is not limited in this embodiment.

In step 104, a device preemption correlation between the first device and the second device is established in response to the first correlation strength being greater than the second correlation strength.

The device preemption correlation refers to disconnecting an original device correlation and establishing a device correlation between a preempting device and one of two devices between which a device correlation is pre-established.

In a case that the first correlation strength is greater than the second correlation strength, that is, in a case that the correlation strength between the first device and the second device is greater than the correlation strength between the second device and the third device, it means that a condition for establishing a device preemption correlation is satisfied, then the device preemption correlation between the first device and the second device may be established.

Certainly, in a case that the first correlation establishment request transmitted by the first device indicates establishing a device correlation between the first device and the third device, and a third correlation strength (that is, a correlation strength between the first device and the third device) is greater than or equal to the second correlation strength, it means that the first device and the third device satisfy a condition for establishing a device preemption correlation, then the device preemption correlation between the first device and the third device may be established.

The embodiments of the present disclosure are implemented to achieve the combination correlation or the preemption correlation by calculating the correlation strengths of different devices and according to the situation of a party requesting the correlation, so that a dynamic correlation between different devices may be achieved.

According to the method of establishing the device correlation provided by the embodiments of the present disclosure, the first correlation establishment request transmitted by the first device is received, the first correlation establishment request indicates establishing a correlation between the first device and the second device, and a device correlation is pre-established between the second device and the third device; the first correlation strength between the first device and the second device as well as the second correlation strength between the second device and the third device are acquired; a device combination correlation is established between the first device, the second device and the third device in response to the first correlation strength being less than or equal to the second correlation strength, and a device preemption correlation between the first device and the second device is established in response to the first correlation strength being greater than the second correlation strength. The embodiments of the present disclosure may be implemented to achieve the combination correlation or the preemption correlation by calculating the correlation strengths of different devices and according to the situation of the device requesting the correlation, so that the dynamic correlation between different devices may be achieved.

Figure 2:
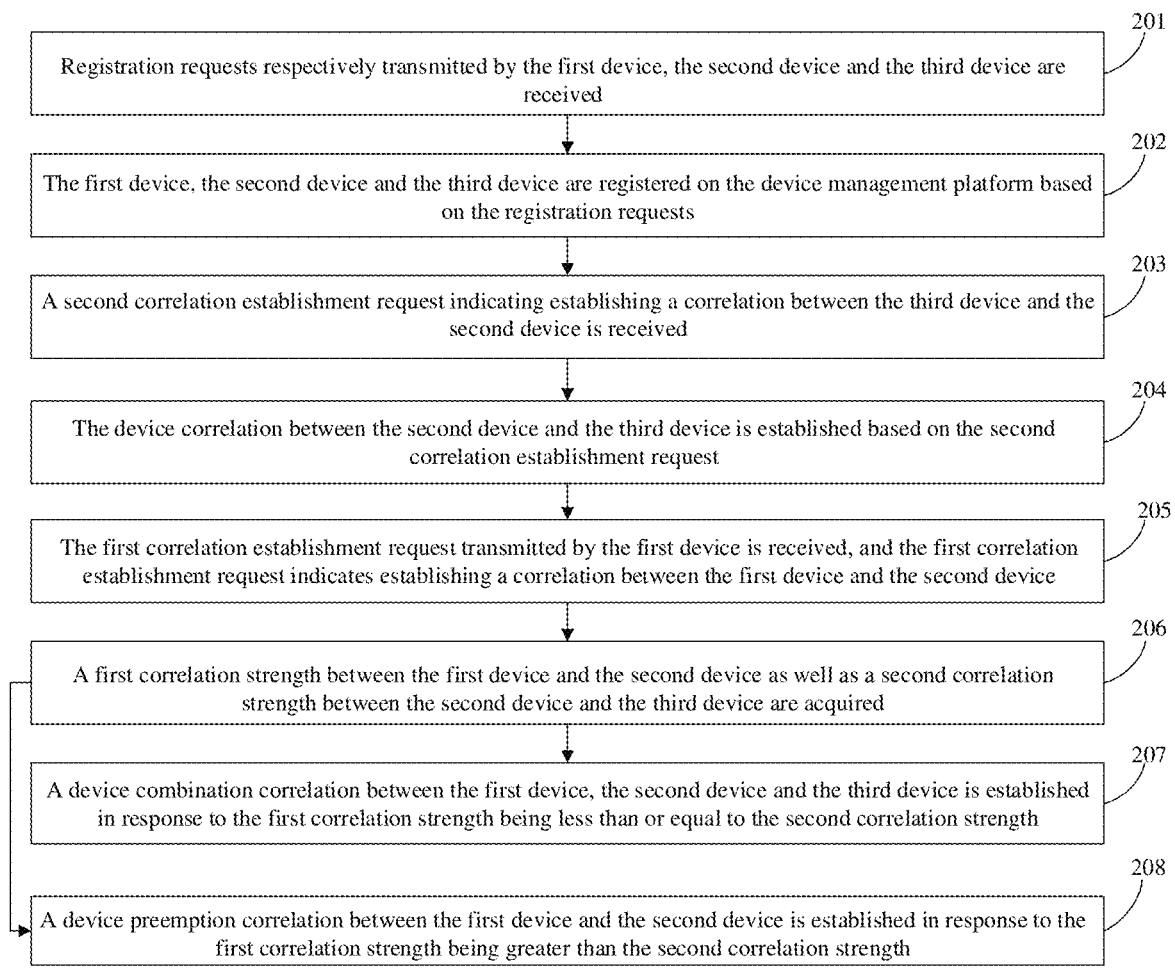
FIG. 2 shows a step flowchart of a method of establishing a device correlation provided by some embodiments of the present disclosure.

FIG. 2 shows a step flowchart of a method of establishing a device correlation provided by some embodiments of the present disclosure. The method of establishing the device correlation may be applied to a device management platform, and may specifically include following steps.

In step 201, registration requests respectively transmitted by the first device, the second device and the third device are received.

In the embodiments of the present disclosure, the device management platform refers to a platform used to manage devices. The device may refer to a household device, such as a refrigerator, a television, an air purifier, a magic mirror, and other electronic devices.

The first device, the second device and the third device described above refer to three different devices. For example, the first device may be a television, the second device may be a refrigerator, and the third device may be an air purifier. Certainly, the first device, the second device and the third device may also be devices of the same type. For example, the first device, the second device and the third device are all refrigerators. It may be understood that when the first device, the second device and the third device are all refrigerators, these three devices may be devices of the same type in the same household or in different households, that is, these three devices are three different devices of the same type. For example, the first device is a refrigerator 1, the second device is a refrigerator 2, the third device is a refrigerator 3, and so on.

It may be understood that the above examples are listed only for better understanding of the technical solutions of the embodiments of the present disclosure, and are not intended as a limitation to the embodiments of the present disclosure.

The registration requests refer to requests respectively transmitted by the first device, the second device and the third device to the device management platform to register on the device management platform.

The device management platform may receive the registration requests transmitted by the first device, the second device and the third device, and then perform step 202.

In step 202, the first device, the second device and the third device are registered on the device management platform based on the registration requests.

After the device management platform receives the registration requests respectively transmitted by the first device, the second device and the third device, the first device, the second device and the third device may be registered on the device management platform respectively according to the registration requests.

After the registration, the device management platform may determine whether to establish a device correlation according to the correlation strength between the devices, manage the devices, and so on.

After the first device, the second device and the third device are registered on the device management platform based on the registration requests, step 203 is performed.

In step 203, a second correlation establishment request indicating establishing a correlation between the third device and the second device is received.

The second correlation establishment request may be a request transmitted by the second device to establish a device correlation with the third device, or a request transmitted by the third device to establish a device correlation with the second device.

When the second correlation establishment request is the request transmitted by the second device to establish the device correlation with the third device, the second device may firstly transmit a discovery request according to a device discovery protocol. After receiving the discovery request, the third device may return a discovery response message to the second device. The response contains a device identity of the third device and indicates that the third device may establish a device correlation with the second device.

After receiving the discovery response message returned by the third device, the second device may generate a second correlation establishment request by combining the device identity of the third device and the device identity of the second device, and transmit the second correlation establishment request to the device management platform.

When the second correlation establishment request is the request transmitted by the third device to establish the device correlation with the second device, the specific implementation process may be as described in the above solution, which will not be described in detail in the embodiment of the present disclosure.

After the device management platform receives the second correlation establishment request, step 204 is performed.

In step 204, the device correlation between the second device and the third device is established based on the second correlation establishment request.

After the second correlation establishment request is received, the device correlation between the second device and the third device may be established based on the second correlation establishment request.

After receiving the second correlation establishment request transmitted by the second device or the third device, the device management platform may parse the second correlation establishment request, acquire the second device and the third device that need to establish a device correlation according to a parsing result, and establish the device correlation between the second device and the third device.

After the device correlation between the second device and the third device is established, step 205 is performed.

In step 205, the first correlation establishment request transmitted by the first device is received. The first correlation establishment request indicates establishing a correlation between the first device and the second device.

The first correlation establishment request refers to a request initiated by the first device to the device management platform to establish a correlation with the second device. Certainly, since the device correlation between the second device and the third device was already established, the first correlation establishment request may also be a request initiated by the first device to establish a correlation with the third device, which may be specifically determined according to actual conditions.

A process of initiating the first correlation establishment request by the first device is the same as a process of initiating the second correlation establishment request by the second device or the third device. The specific description may refer to the above-mentioned process of transmitting the second correlation establishment request, which will not be described in detail in the embodiment of the present disclosure.

After the first correlation establishment request transmitted by the first device is received, step 206 is performed.

In step 206, a first correlation strength between the first device and the second device as well as a second correlation strength between the second device and the third device are acquired.

The first correlation strength refers to a correlation strength between the first device and the second device, and the second correlation strength refers to a correlation strength between the first device and the third device.

The method of acquiring the first correlation strength may include acquiring a number of device through which the first device and the second device exchange information, and calculating the first correlation strength according to the number of device.

The method of acquiring the second correlation strength may include acquiring a number of device through which the second device and the third device exchange information, and calculating the second correlation strength according to the number of device.

A process of calculating the first correlation strength and the second correlation strength may be described in detail in combination with the following two embodiments respectively.

In some embodiments of the present disclosure, the step 206 may include following sub-steps.

In sub-step A1, a first device type of the first device and a second device type of the second device are acquired.

In the embodiments of the present disclosure, the first device type refers to a type of the first device. The first device type may be a refrigerator, a television, an air conditioner, and the like, which may be determined according to actual conditions.

The second device type refers to a type of the second device. The second device type may be a refrigerator, a television, an air conditioner, and the like, which may be determined according to actual conditions.

It may be understood that the first device type and the second device type may be the same device type, or may be different device types, which may be specifically determined according to actual conditions and is not limited in the embodiments of the present disclosure.

After receiving the first correlation establishment request containing a device identity of the first device and a device identity of the second device, the device management platform may acquire registration information of the first device and the second device on the platform based on respective device identities of the first device and the second device, and then acquire the first device type of the first device and the second device type of the second device according to the registration information of the first device and the second device.

Certainly, when the first device transmits the first correlation establishment request, the device type of the first device and the device type of the second device may be carried in the first correlation establishment request. The device management platform may directly parse the first correlation establishment request, so as to acquire the first device type of the first device and the second device type of the second device.

In a specific implementation, those skilled in the art may acquire the first device type of the first device in other ways, which may be specifically determined according to business requirements and is not limited in the embodiments of the present disclosure.

After the first device type of the first device and the second device type of the second device are acquired, sub-step A2 is performed.

In sub-step A2, a second number between the first device and the second device is acquired. The second number indicates a number of device, such as a number of route, through which the first device and the second device exchange information.

The device management platform may determine a networking information of the household devices of the family according to the registration information of the household devices, and then acquire the second number of device through which the first device and the second device exchange information according to the networking information of the household devices.

In a specific implementation, the second number may be acquired in other ways, which is not limited in the embodiments of the present disclosure.

After the second number is acquired, sub-step A3 is performed.

In sub-step A3, the first correlation strength is calculated based on the first device type, the second device type and the second number.

After the first device type, the second device type and the second number are acquired, the first correlation strength may be calculated based on the first device type, the second device type and the second number. A calculation process may be as shown in Table 1.

TABLE 1

|      | AE1          | AE2          | Correlation strength |
|------|--------------|--------------|----------------------|
| Type | Refrigerator | Refrigerator | 10                   |
| Span | 1            | 1            | 10                   |

As shown in Table 1, when the first device AE1 and the second device AE2 are of the same type, such as a refrigerator, the correlation strength between the two is 10, and when a span (that is, a first number) is 1, the correlation strength is also 10. The two correlation strengths may be added to obtain the first correlation strength between the first device and the second device, which is equal to 20.

It may be understood that the correlation strengths corresponding to the type of the two devices and the correlation strengths for different spans may be preset on the device management platform. A specific setting process may be determined according to business requirements and is not limited in the embodiments of the present disclosure.

In a specific implementation, those skilled in the art may acquire the first correlation strength in other ways, which may be specifically determined according to business requirements and is not limited in the embodiments of the present disclosure.

In another preferable embodiment of the present disclosure, the step 206 may include following sub-steps.

In sub-step B1, the second device type of the second device and the third device type of the third device are acquired.

In the embodiments of the present disclosure, the second device type refers to the type of the second device. The second device type may be a refrigerator, a television, an air conditioner, and the like, which may be determined according to actual conditions.

The third device type refers to the type of the third device. The third device type may be a refrigerator, a television, an air conditioner, and the like, which may be determined according to actual conditions.

It may be understood that the second device type and the third device type may be the same device type, or may be different device types, which may be specifically determined according to actual conditions and is not limited in the embodiments of the present disclosure.

After receiving the second correlation establishment request containing the device identity of the second device and the device identity of the third device, the device management platform may acquire the registration information of the second device and the third device on the platform based on the respective device identities of the second device and the third device, and then acquire the second device type of the second device and the third device type of the third device according to the registration information of the second device and the third device.

Certainly, when the second device or the third device transmits the second correlation establishment request, the device type of the second device and the device type of the third device may be carried in the second correlation establishment request. The device management platform may directly parse the second correlation establishment request, so as to acquire the second device type of the second device and the third device type of the third device.

In a specific implementation, those skilled in the art may acquire the second device type of the second device and the third device type of the third device in other ways, which may be specifically determined according to business requirements and is not limited in the embodiments of the present disclosure.

After the second device type of the second device and the third device type of the third device are acquired, sub-step B2 is performed.

In sub-step B2, a first number between the second device and the third device is acquired. The first number indicates a number of device, such as a number of route, through which the second device and the third device exchange information.

The device management platform may determine a networking information of the household devices of the family according to the registration information of the household devices, and then acquire the first number of device through which the second device and the third device exchange information according to the networking information of the household devices.

In a specific implementation, the first number may be acquired in other ways, which is not limited in the embodiments of the present disclosure.

After the first number between the second device and the third device is acquired, sub-step B3 is performed.

In sub-step B3, the second correlation strength is calculated based on the second device type, the third device type and the first number.

After the second device type, the third device type and the first number are acquired, the second correlation strength may be calculated based on the second device type, the third device type and the first number. A specific process of calculating the second correlation strength is similar to the process of calculating the first correlation strength in the sub-step A3, which will not be described in detail in this embodiment.

After the first correlation strength between the first device and the second device and the second correlation strength between the second device and the third device are acquired, step 207 is performed, or step 208 is performed.

In step 207, a device combination correlation between the first device, the second device and the third device is established in response to the first correlation strength being less than or equal to the second correlation strength.

Figure 3A:
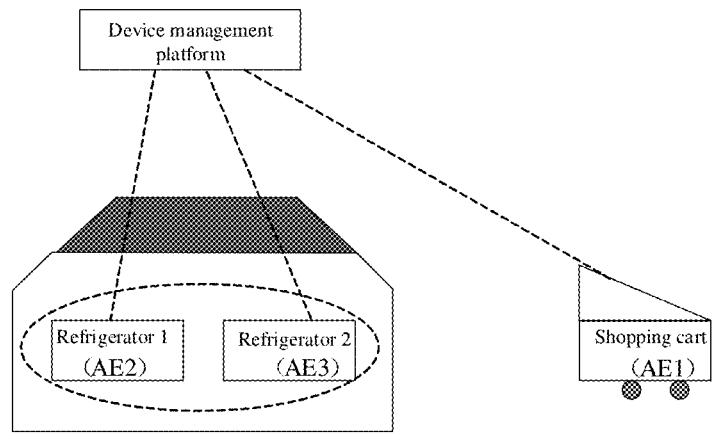
FIG. 3*a* shows a schematic diagram of establishing a combination correlation provided by some embodiments of the present disclosure.
Figure 3A:
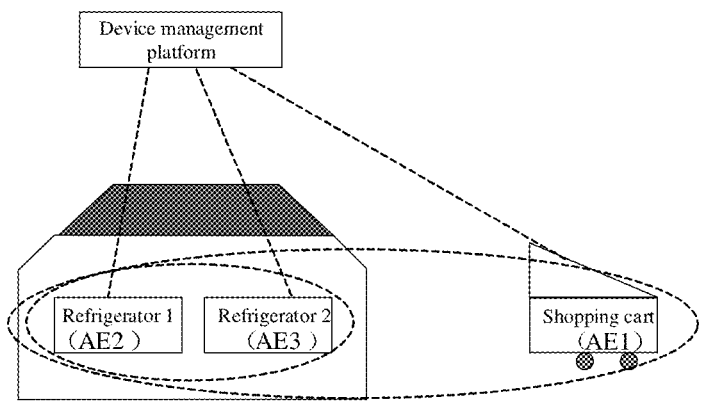

In a case that the first correlation strength is less than or equal to the second correlation strength, that is, in a case that the correlation strength between the first device and the second device is less than or equal to the correlation strength between the second device and the third device, because the device correlation between the second device and the third device was already established, a device combination correlation between the first device, the second device and the third device may be established. For example, FIG. 3a shows a schematic diagram of establishing the combination correlation provided by the embodiments of the present disclosure. As shown in FIG. 3a, on the device management platform, the first device may be represented by AE1, the second device may be represented by AE2, the third device may be represented by AE3, the device correlation established between the second device and the third device may be represented by (AE2, AE3), and the combination correlation established between the first device, the second device and the third device when AE1, AE2 and AE3 satisfy the condition for establishing the device combination correlation may be represented by (AE1, (AE2, AE3)).

It may be understood that the above examples are listed only for better understanding of the technical solutions of the embodiments of the present disclosure, and are not intended as a limitation to the embodiments of the present disclosure.

Certainly, in the present disclosure, a correlation strength threshold may be preset, and the device correlation between the devices is established only in a case that the correlation strength between the devices is greater than the correlation strength threshold.

The correlation strength threshold refers to a threshold of the correlation strength between devices preset by a servicer on the device management platform.

The correlation strength threshold may be 5, 8, 10, etc., which may be specifically determined according to business requirements and is not limited in the embodiments of the present disclosure.

A device correlation between two devices may be established when a correlation strength between the two devices is greater than the correlation strength threshold. When the correlation strength between the two devices is less than or equal to the correlation strength threshold, the two devices do not meet a condition for establishing the device correlation.

A magnitude relationship between the first correlation strength and the correlation strength threshold may be determined.

In a case that the first correlation strength and the second correlation strength are greater than the correlation strength threshold, it means that the device correlation between the first device and the second device may be established, and the device correlation between the first device and the third device may be established.

In a case that the first correlation strength is less than or equal to the second correlation strength, that is, in a case that the correlation strength between the first device and the second device is less than or equal to the correlation strength between the second device and the third device, it may be determined whether the first correlation strength is greater than the correlation strength threshold or not.

Only when it is determined that the first correlation strength is greater than the correlation strength threshold, the device combination correlation between the first device, the second device and the third device may be established.

Certainly, in the present disclosure, it is also possible to determine whether to establish a long-term correlation or a short-term correlation between the three devices according to the device type of the first device, which may be described in detail in the following embodiments and is not limited in this embodiment.

In some embodiments of the present disclosure, the step 207 may include following sub-steps.

In sub-step C1, a short-term device combination correlation between the first device, the second device and the third device is established.

In sub-step C2, a long-term device combination correlation between the first device, the second device and the third device is established.

In the embodiments of the present disclosure, the short-term device combination correlation refers to the device correlation established between devices for a short term, such as one month or two months.

The long-term device combination correlation refers to the device correlation established between devices for a long term, such as two years or three years.

In the present disclosure, whether to establish the short-term device combination correlation or establish the long-term device combination correlation may be determined with reference to whether the first device is a temporary device or a long-term device, which may be described in detail in conjunction with the following embodiments.

In another embodiment of the present disclosure, the sub-step C1 may include sub-step D1.

In sub-step D1, the short-term device combination correlation between the first device, the second device and the third device are established in response to the first device being a temporary device.

The sub-step C2 may include sub-step D2.

In sub-step D2, the long-term device combination correlation between the first device, the second device, and the third device is established in response to the first device being a long-term device.

The temporary device refers to a device that is used temporarily. For example, for a family, some household devices, such as air purifiers, are not used frequently, but used only once every a certain period of time (such as one month or two months, etc.). Such a household device may be determined as the temporary device.

In a case that the first device is the temporary device, the short-term device combination correlation between the first device, the second device and the third device may be established. For example, when the first device AE1 is a shopping cart, since AE1 is a temporary device, the short-term combination correlation may be established, and a start time and an end time of the correlation need to be recorded.

By establishing the short-term device combination correlation, a storage of a long-term correlation between devices on the platform may be avoided, which may avoid occupying a platform space, and achieve an effective use of resources.

The long-term device refers to a device that is used for a long time. For example, a rice cooker is a long-term household device, and may be determined as a long-term device.

In a case that the first device is the long-term device, the long-term device combination correlation between the first device, the second device and the third device may be established. For example, when the first device AE1 is a rice cooker, since the rice cooker is a long-term device, the long-term combination correlation may be established, and only a start time of the correlation needs to be recorded.

Certainly, in the present disclosure, it is also possible to determine whether to establish a strong correlation, a normal correlation or a weak correlation based on the correlation strength between the devices. The strong correlation may be established in a manner of a group, the weak correlation may be established in a manner of link bonding, and the normal correlation may be established in one of the two manners described above. This process will not be described in detail in the embodiments of the present disclosure.

In step 208, a device preemption correlation between the first device and the second device is established in response to the first correlation strength being greater than the second correlation strength.

The device preemption correlation refers to disconnecting an original device correlation and establishing a device correlation between a preempting device and one of two devices between which a device correlation was pre-established.

In a case that the first correlation strength is greater than the second correlation strength, that is, in a case that the correlation strength between the first device and the second device is greater than the correlation strength between the second device and the third device, it means that a condition for establishing a device preemption correlation is satisfied, then the device preemption correlation between the first device and the second device may be established.

Certainly, in a case that the first correlation establishment request transmitted by the first device indicates establishing a device correlation between the first device and the third device, and the second correlation strength (that is, the correlation strength between the first device and the third device) is less than the third correlation strength (that is, the correlation strength between the first device and the third device), it means that the first device and the third device satisfy a condition for establishing a device preemption correlation, then the device preemption correlation between the first device and the third device may be established.

Figure 3B:
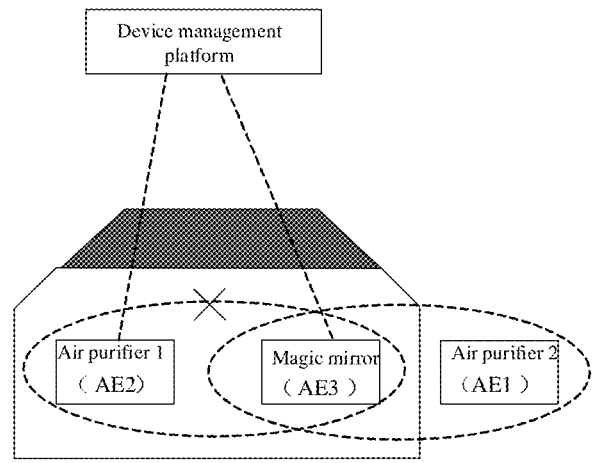
FIG. 3*b* shows a schematic diagram of establishing a preemption correlation provided by some embodiments of the present disclosure.

A specific process of establishing the preemption correlation is shown in FIG. 3*b*. FIG. 3*b* shows a schematic diagram of establishing the preemption correlation provided by the embodiments of the present disclosure. As shown in FIG. 3*b*, on the device management platform, the first device, which is an air purifier 2, may be represented by AE1, the second device, which is an air purifier 1, may be represented by AE2, and the third device, which is a magic mirror, may be represented by AE3. A device correlation (AE2, AE3) is pre-established between AE2 and AE3. When AE1 and AE3 satisfy the condition for establishing the preemption correlation, the device correlation between AE2 and AE3 may be disconnected, as shown by "X" in FIG. 3*b*, and the preemption correlation (AE1, AE3) between AE1 and AE3 may be established.

It may be understood that the above examples are listed only for better understanding of the technical solutions of the embodiments of the present disclosure, and are not intended as a limitation to the embodiments of the present disclosure.

The embodiments of the present disclosure are implemented to achieve the combination correlation or the preemption correlation by calculating the correlation strength of different devices and according to the situation of a party requesting the correlation, so that a dynamic correlation between different devices may be achieved.

According to the method of establishing the device correlation provided by the embodiments of the present disclosure, the first correlation establishment request transmitted by the first device is received, the first correlation establishment request indicates establishing a correlation between the first device and the second device, and a device correlation is pre-established between the second device and the third device; the first correlation strength between the first device and the second device as well as the second correlation strength between the second device and the third device are acquired; a device combination correlation is established between the first device, the second device and the third device in response to the first correlation strength being less than or equal to the second correlation strength, and a device preemption correlation between the first device and the second device is established in response to the first correlation strength being greater than the second correlation strength. The embodiments of the present disclosure are implemented to achieve the combination correlation or the preemption correlation by calculating the correlation strength of different devices and according to the situation of a requesting party, so that a dynamic correlation between different devices may be achieved.

Figure 4:
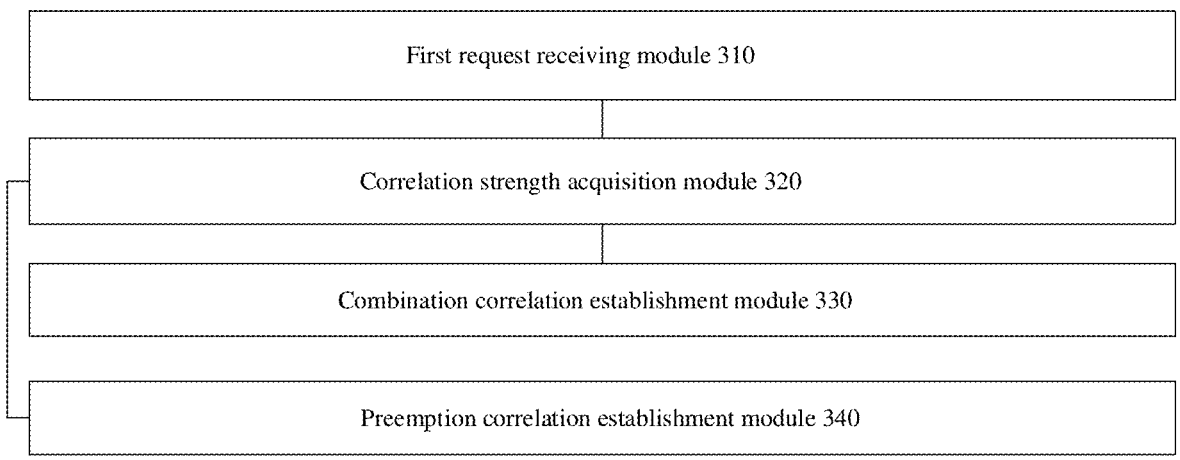
FIG. 4 shows a schematic structural diagram of an apparatus of establishing a device correlation provided by some embodiments of the present disclosure.

FIG. 4 shows a schematic structural diagram of an apparatus of establishing a device correlation provided by some embodiments of the present disclosure. The apparatus of establishing the device correlation may be applied to a device management platform, and may specifically include following modules.

A first request receiving module 310 is used to receive a first correlation establishment request transmitted by a first device. The first correlation establishment request indicates establishing a correlation between the first device and a second device. A device correlation is established between the second device and a third device.

A correlation strength acquisition module 320 is used to acquire a first correlation strength between the first device and the second device, and a second correlation strength between the second device and the third device.

A combination correlation establishment module 330 is used to establish a device combination correlation between the first device, the second device and the third device in response to the first correlation strength being less than or equal to the second correlation strength.

A preemption correlation establishment module 340 is used to establish a device preemption correlation between the first device and the second device in response to the first correlation strength being greater than the second correlation strength.

According to the apparatus of establishing the device correlation provided by the embodiments of the present disclosure, the first correlation establishment request transmitted by the first device is received, the first correlation establishment request indicates establishing a correlation between the first device and the second device, and a device correlation is pre-established between the second device and the third device; the first correlation strength between the first device and the second device as well as the second correlation strength between the second device and the third device are acquired; a device combination correlation is established between the first device, the second device and the third device in response to the first correlation strength being less than or equal to the second correlation strength, and a device preemption correlation between the first device and the second device is established in response to the first correlation strength being greater than the second correlation strength. The embodiments of the present disclosure are implemented to achieve the combination correlation or the preemption correlation by calculating the correlation strength of different devices and according to the situation of a party requesting the correlation, so that a dynamic correlation between different devices may be achieved.

Figure 5:
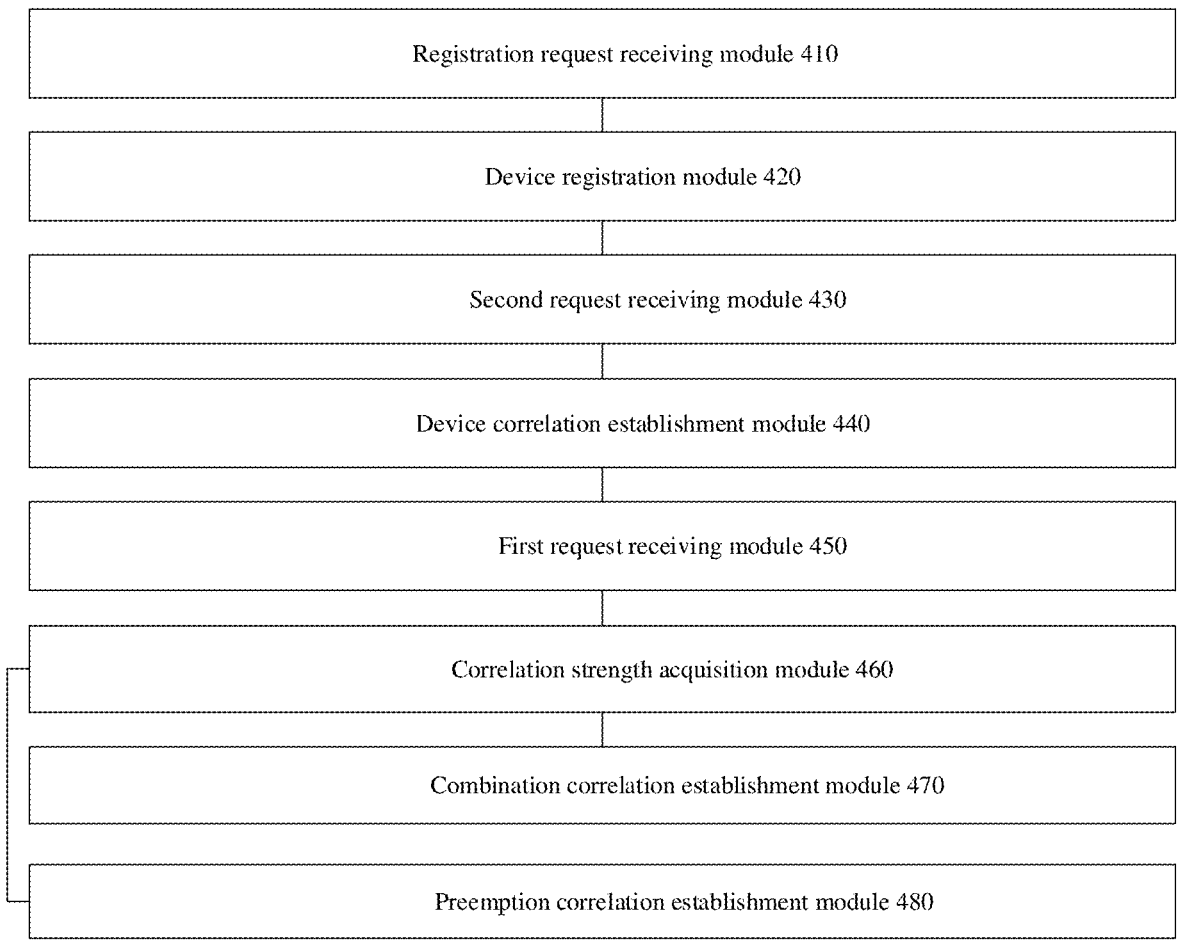
FIG. 5 shows a schematic structural diagram of an apparatus of establishing a device correlation provided by some embodiments of the present disclosure.

FIG. 5 shows a schematic structural diagram of an apparatus of establishing a device correlation provided by some embodiments of the present disclosure. The apparatus of establishing the device correlation may be applied to a device management platform, and may specifically include following modules.

A registration request receiving module 410 is used to receive registration requests respectively transmitted by the first device, the second device and the third device.

A device registration module 420 is used to register the first device, the second device and the third device on the device management platform based on the registration requests.

A second request receiving module 430 is used to receive a second correlation establishment request indicating establishing a correlation between the third device and the second device.

A device correlation establishment module 440 is used to establish the device correlation between the second device and the third device based on the second correlation establishment request.

A first request receiving module 450 is used to receive a first correlation establishment request transmitted by a first device. The first correlation establishment request indicates establishing a correlation between the first device and a second device. A device correlation is established between the second device and a third device.

A correlation strength acquisition module 460 is used to acquire a first correlation strength between the first device and the second device, and a second correlation strength between the second device and the third device.

A combination correlation establishment module 470 is used to establish a device combination correlation between the first device, the second device and the third device in response to the first correlation strength being less than or equal to the second correlation strength.

A preemption correlation establishment module 480 is used to establish a device preemption correlation between the first device and the second device in response to the first correlation strength being greater than the second correlation strength.

In some embodiments, the correlation strength acquisition module 460 may include following sub-modules.

A first type and second type acquisition sub-module is used to acquire the first device type of the first device and the second device type of the second device.

A second number acquisition sub-module is used to acquire a second number between the first device and the second device. The second number indicates a number of device through which the first device and the second device exchange information.

A first strength calculation sub-module is used to calculate the first correlation strength based on the first device type, the second device type and the second number.

In some embodiments, the correlation strength acquisition module 460 may include following sub-modules.

A second type and third type acquisition sub-module is used to acquire a second device type of the second device and a third device type of the third device.

A first number acquisition sub-module is used to acquire a first number between the second device and the third device. The first number indicates a number of device through which the second device and the third device exchange information.

A second strength calculation sub-module is used to calculate the second correlation strength based on the second device type, the third device type and the first number.

In some embodiments, the combination correlation establishment module 470 may include: a short-term combination correlation establishment sub-module used to establish a short-term device combination correlation between the first device, the second device and the third device; or a long-term combination correlation establishment sub-module used to establish a long-term device combination correlation between the first device, the second device and the third device.

In some embodiments, the short-term combination correlation establishment sub-module may include a short-term correlation establishment sub-module used to establish the short-term device combination correlation between the first device, the second device and the third device in response to the first device being a temporary device.

In some embodiments, the long-term combination correlation establishment sub-module may include a long-term correlation establishment sub-module used to establish the long-term device combination correlation between the first device, the second device, and the third device in response to the first device being a long-term device.

According to the apparatus of establishing the device correlation provided by the embodiments of the present disclosure, the first correlation establishment request transmitted by the first device is received, the first correlation establishment request indicates establishing a correlation between the first device and the second device, and a device correlation is pre-established between the second device and the third device; the first correlation strength between the first device and the second device as well as the second correlation strength between the second device and the third device are acquired; a device combination correlation is established between the first device, the second device and the third device in response to the first correlation strength being less than or equal to the second correlation strength, and a device preemption correlation between the first device and the second device is established in response to the first correlation strength being greater than the second correlation strength. The embodiments of the present disclosure are implemented to achieve the combination correlation or the preemption correlation by calculating the correlation strength of different devices and according to the situation of a party requesting the correlation, so that a dynamic correlation between different devices may be achieved.

Figure 6:
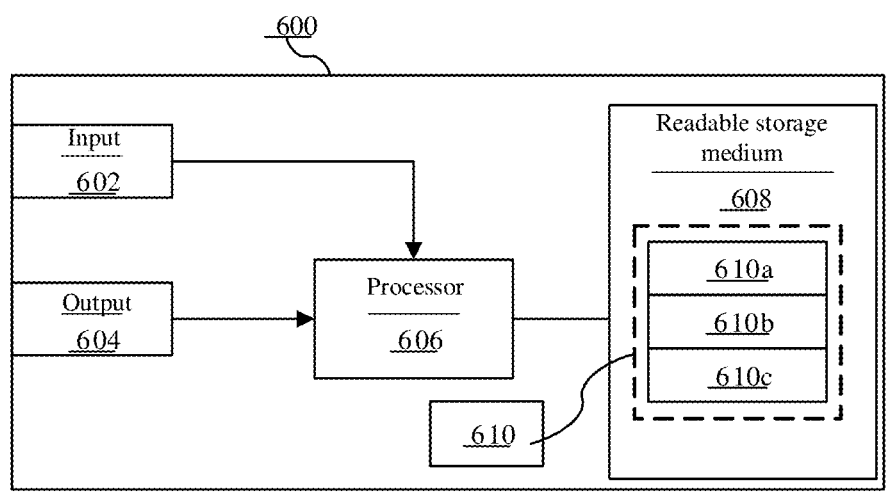
FIG. 6 shows a schematic arrangement diagram of hardware of an electronic device for establishing a device correlation according to some embodiments of the present disclosure.

FIG. 6 shows a schematic arrangement diagram of hardware of an electronic device 600 (for example, the device shown in FIG. 4 or FIG. 5) for establishing a device correlation according to some embodiments of the present disclosure. The hardware arrangement 600 may include a processor or controller 606 (e.g., a digital signal processor (DSP), a central processing unit (CPU), etc.). The processor 606 may be a single processing unit or a plurality of processing units for executing different actions of the processes described herein. The arrangement 600 may further include an input unit 602 for receiving signals from other entities, and an output unit 604 for providing signals to other entities. The input unit 602 and the output unit 604 may be arranged as a single entity or separate entities.

In addition, the arrangement 600 may include at least one computer-readable storage medium 608 in the form of non-volatile or volatile memory, such as an electrically erasable programmable read-only memory (EEPROM), flash memory, a hard drive, and/or other non-transitory computer-readable storage mediums. The readable storage medium 608 includes a computer program 610 containing code/computer readable instructions that, when executed by the processor 606 in the arrangement 600, cause the hardware arrangement 600 and/or an electronic device including the hardware arrangement 600 to perform, for example, the flow of any process described above with reference to FIG. 1 to FIG. 2 and any modification thereof.

The computer program 610 may be configured to have a computer program code constructed by, for example, computer program modules 610*a* to 610*c*. Therefore, in an exemplary embodiment in which the hardware arrangement 600 is used in the electronic device, the code in the computer program of the arrangement 600 may include: the module 610*a* used to receive the first correlation establishment request transmitted by the first device; the first correlation establishment request indicates establishing a correlation between the first device and a second device, and a device correlation is established between the second device and a third device; the module 610*b* used to acquire the first correlation strength between the first device and the second device as well as the second correlation strength between the second device and the third device; and the module 610*c* used to establish the device combination correlation between the first device, the second device and the third device in response to the first correlation strength being less than or equal to the second correlation strength, and establish the device preemption correlation between the first device and the second device in response to the first correlation strength being greater than the second correlation strength.

The computer program module may substantially execute each action in the flow shown in FIG. 1 to FIG. 2, so as to simulate the electronic device. In other words, when different computer program modules are executed in the processor or controller 606, they may correspond to different units or modules in FIG. 4 or FIG. 5.

Although the code means in the embodiment disclosed above with reference to FIG. 6 is implemented as a computer program module that, when executed in the processor 606, causes the hardware arrangement 600 to execute the actions described above with reference to FIG. 1 to FIG. 2, at least one of the code means in alternative embodiments may be at least partially implemented as a hardware circuit.

The processor may be a single CPU (Central Processing Unit), but may also include two or more processing units. For example, the processor may include a general-purpose microprocessor, an instruction set processor and/or a related chipset and/or a special-purpose microprocessor (for example, an application specific integrated circuit (ASIC)). The processor may further include an on-board memory for a caching purpose. The computer program may be carried by a computer program product connected to the processor. The computer program product may include a computer-readable medium having a computer program stored thereon. For example, the computer program product may be flash memory, random access memory (RAM), read-only memory (ROM), EEPROM, and the above-mentioned computer program modules may be distributed into different program products in the form of a memory in the electronic device in an alternative embodiment.

Various embodiments in the specification are described in a progressive manner. Each embodiment focuses on the differences from other embodiments, and the same or similar parts between the various embodiments may be referred to each other.

Finally, it should be noted that in the present disclosure, relational terms such as first and second are only used to distinguish one entity or operation from another entity or operation, and do not necessarily require or imply that there is any such actual relationship or order between these entities or operations. Moreover, the terms "comprise", "include" or any other variants thereof are intended to cover non-exclusive inclusion, so that a process, method, product or apparatus including a series of elements not only includes those elements, but also includes other elements not clearly listed, or further includes elements inherent to this process, method, product or apparatus. If there are no more restrictions, the element defined by "including a(an) . . . " does not exclude the existence of other identical elements in the process, method, product or apparatus that includes the element.

The method of establishing the device correlation, the apparatus of establishing the device correlation and the electronic device provided by the present disclosure are described in detail above. Specific examples are used herein to illustrate the principles and implementations of the present disclosure. The description of the above embodiments is only to help understand the method and core ideas of the present disclosure. Moreover, for those of ordinary skilled in the art, there may be changes in the specific implementation and the scope of application according to the ideas of the present disclosure. In summary, the content of the specification should not be construed as limiting the present disclosure.

What is claimed is:

1. A method of establishing a device correlation performed at a device management platform, comprising:
   receiving a first correlation establishment request transmitted by a first device, wherein the first correlation establishment request indicates establishing a correlation between the first device and a second device, and a device correlation is established between the second device and a third device;
   acquiring a first correlation strength between the first device and the second device, and a second correlation strength between the second device and the third device;
   establishing a device combination correlation between the first device, the second device and the third device in response to the first correlation strength being less than or equal to the second correlation strength; and
   establishing a device preemption correlation between the first device and the second device in response to the first correlation strength being greater than the second correlation strength.

2. The method of claim 1, further comprising: prior to receiving the first correlation establishment request transmitted by the first device,
   receiving a second correlation establishment request indicating establishing a correlation between the third device and the second device; and
   establishing the device correlation between the second device and the third device based on the second correlation establishment request.

3. The method of claim 2, further comprising: prior to receiving the second correlation establishment request,
   receiving registration requests respectively transmitted by the first device, the second device and the third device; and
   registering the first device, the second device and the third device on the device management platform based on the registration requests.

4. The method of claim 1, wherein the acquiring a first correlation strength between the first device and the second device comprises:
   acquiring a first device type of the first device and a second device type of the second device;
   acquiring a second number between the first device and the second device, wherein the second number indicates a number of device through which the first device and the second device exchange information; and
   calculating the first correlation strength based on the first device type, the second device type and the second number.

5. The method of claim 1, wherein the acquiring a second correlation strength between the second device and the third device comprises:
   acquiring a second device type of the second device and a third device type of the third device;
   acquiring a first number between the second device and the third device, wherein the first number indicates a number of device through which the second device and the third device exchange information; and
   calculating the second correlation strength based on the second device type, the third device type and the first number.

6. The method of claim 1, wherein the establishing a device combination correlation between the first device, the second device and the third device comprises:
   establishing a short-term device combination correlation between the first device, the second device and the third device; or
   establishing a long-term device combination correlation between the first device, the second device and the third device.

7. The method of claim 6, wherein the establishing a short-term device combination correlation between the first device, the second device and the third device comprises:
   establishing the short-term device combination correlation between the first device, the second device and the third device in response to the first device being a temporary device.

8. The method of claim 6, wherein the establishing a long-term device combination correlation between the first device, the second device and the third device comprises:
   establishing the long-term device combination correlation between the first device, the second device and the third device in response to the first device being a long-term device.

9. An electronic device of establishing a device correlation, comprising:
   a processor;
   a memory having instructions stored thereon, wherein the instructions, when executed by the processor, cause the processor to:
   receive a first correlation establishment request transmitted by a first device, wherein the first correlation establishment request indicates establishing a correlation between the first device and a second device, and a device correlation is established between the second device and a third device;

acquire a first correlation strength between the first device and the second device, and a second correlation strength between the second device and the third device;

establish a device combination correlation between the first device, the second device and the third device in response to the first correlation strength being less than or equal to the second correlation strength; and establish a device preemption correlation between the first device and the second device in response to the first correlation strength being greater than the second correlation strength.

10. The electronic device of claim 9, wherein the instructions, when executed by the processor, further cause the processor to:

receive a second correlation establishment request indicating establishing a correlation between the third device and the second device; and establish the device correlation between the second device and the third device based on the second correlation establishment request.

11. The electronic device of claim 10, wherein the instructions, when executed by the processor, further cause the processor to:

receive registration requests respectively transmitted by the first device, the second device and the third device; and register the first device, the second device and the third device on the device management platform based on the registration requests.

12. The electronic device of claim 9, wherein the instructions, when executed by the processor, further cause the processor to:

acquire a first device type of the first device and a second device type of the second device;

acquire a second number between the first device and the second device, wherein the second number indicates a number of device through which the first device and the second device exchange information; and calculate the first correlation strength based on the first device type, the second device type and the second number.

13. The electronic device of claim 9, wherein the instructions, when executed by the processor, further cause the processor to:

acquire a second device type of the second device and a third device type of the third device;

acquire a first number between the second device and the third device, wherein the first number indicates a number of device through which the second device and the third device exchange information; and calculate the second correlation strength based on the second device type, the third device type and the first number.

14. The electronic device of claim 9, wherein the instructions, when executed by the processor, further cause the processor to:

establish a short-term device combination correlation between the first device, the second device and the third device; or establish a long-term device combination correlation between the first device, the second device and the third device.

15. The electronic device of claim 14, wherein the instructions, when executed by the processor, further cause the processor to:

establish the short-term device combination correlation between the first device, the second device and the third device in response to the first device being a temporary device.

16. The electronic device of claim 14, wherein the instructions, when executed by the processor, further cause the processor to:

establish the long-term device combination correlation between the first device, the second device and the third device in response to the first device being a long-term device.

17. A computer-readable storage medium having instructions stored thereon, wherein the instructions, when executed by a processor, cause the processor to perform the method of claim 1.

* * * * *